US007485233B2

United States Patent
Vane et al.

(10) Patent No.: US 7,485,233 B2
(45) Date of Patent: Feb. 3, 2009

(54) HYDROPHILIC MIXED MATRIX MATERIAL HAVING REVERSIBLE WATER ABSORBING PROPERTIES

(75) Inventors: Leland Morris Vane, Cincinnati, OH (US); Ravi Prasad Ponangi, Modesto, CA (US)

(73) Assignee: U.S. Environmental Protection Agency, Washington, DC (US)

( * ) Notice: Subject to any disclaimer, the term of this patent is extended or adjusted under 35 U.S.C. 154(b) by 462 days.

(21) Appl. No.: 11/052,894

(22) Filed: Feb. 9, 2005

(65) Prior Publication Data

US 2006/0175249 A1 Aug. 10, 2006

(51) Int. Cl.
*B01D 15/00* (2006.01)
*B01D 39/00* (2006.01)
*B01D 39/14* (2006.01)
*B29C 65/00* (2006.01)
*C01F 1/44* (2006.01)

(52) U.S. Cl. ............... 210/660; 210/502.1; 210/500.25; 210/500.42; 210/500.37; 210/490; 264/41; 264/216; 524/557

(58) Field of Classification Search ............ 210/500.27, 210/500.42, 500.25, 542, 640, 689, 501.2, 210/523, 500.23, 500.37, 660; 95/45, 54; 264/41, 216, 236, 237; 428/543; 524/401, 524/557

See application file for complete search history.

(56) References Cited

U.S. PATENT DOCUMENTS

| 4,016,129 | A  | * | 4/1977  | Miyosawa .................. 524/557 |
| 4,244,824 | A  | * | 1/1981  | Lange et al. ............ 210/500.23 |
| 4,968,430 | A  | * | 11/1990 | Hildenbrand et al. ....... 210/640 |
| 5,409,798 | A  | * | 4/1995  | Kondo et al. ................ 430/203 |
| 5,914,039 | A  | * | 6/1999  | Mahendran et al. .... 210/500.25 |
| 6,024,872 | A  | * | 2/2000  | Mahendran et al. .... 210/500.25 |
| 6,045,697 | A  | * | 4/2000  | Girot et al. .................. 210/635 |
| 6,051,359 | A  | * | 4/2000  | Ohkawa et al. ............. 430/203 |
| 6,562,441 | B1 | * | 5/2003  | Maeda et al. ............ 428/32.34 |
| 6,755,900 | B2 | * | 6/2004  | Koros et al. .................... 96/10 |
| 6,808,768 | B2 | * | 10/2004 | Satou et al. .............. 428/32.25 |
| 6,881,448 | B1 | * | 4/2005  | Hattori ....................... 427/307 |
| 6,890,436 | B2 | * | 5/2005  | Komatsu et al. ....... 210/500.41 |

\* cited by examiner

*Primary Examiner*—Ana M Fortuna
(74) *Attorney, Agent, or Firm*—Hendricks & Associates; Glenna Hendricks

(57) ABSTRACT

Polymer-ceramic mixed matrix compositions contain one or more organic polymers and a nano-sized dispersion of inorganic metal oxide particles which are dispersed throughout the composition. Materials have use in making membranes that act as transfer agents.

11 Claims, 1 Drawing Sheet

Pervaporation Bench Unit

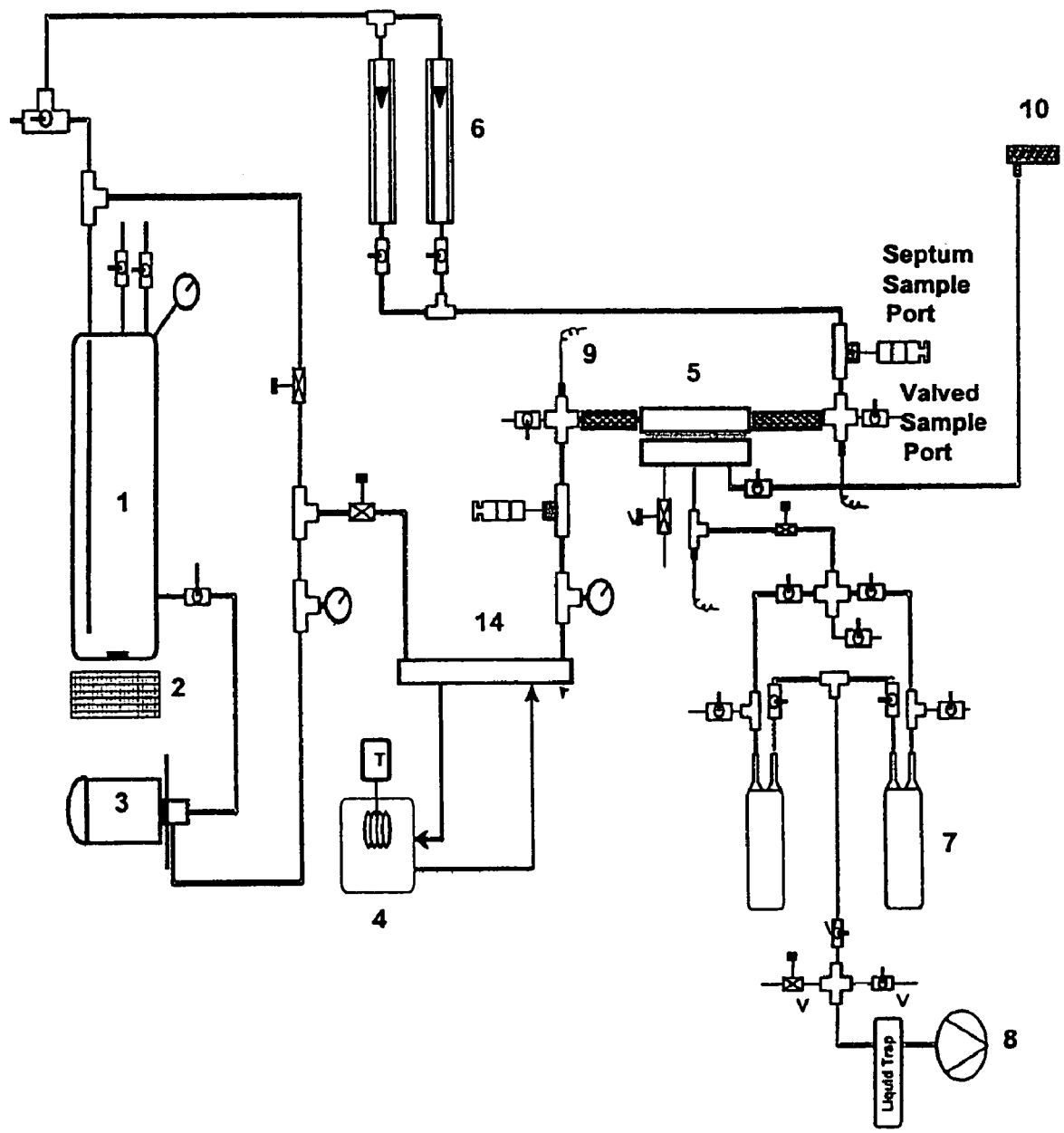
FIG-1. Pervaporation Bench Unit

HYDROPHILIC MIXED MATRIX MATERIAL HAVING REVERSIBLE WATER ABSORBING PROPERTIES

This application takes priority from U.S. application Ser. No. 10/145,383 filed May 15, 2002, which issued at U.S. Pat. No. 6,881,364 on Apr. 19, 2005, and which takes priority from provisional patent application 60/291,014 filed May 16, 2001.

FIELD OF THE INVENTION

This invention relates to membranes and gels that are used to dehydrate organic streams and the preparation of novel mixed matrix composites useful in such processes. Membranes are comprised of a hydrophilic matrix containing at least one organic polymer and an inorganic metal oxide dispersed throughout the polymer. Gels made from the mixed matrix materials can be fabricated in a variety of shapes depending upon the container in which they are developed. The gels may be re-used in the dehydration process once they are stripped of their water content.

BACKGROUND OF THE INVENTION

Alcohols, in particular, 2-propanol (isopropyl alcohol-IPA), are being increasingly utilized in various industries as solvents and cleaning agents. Purification of alcohol streams when contaminated by water at certain concentrations becomes difficult due to the formation of azeotropic mixtures, composition wherein the ratios of the water and alcohol components in vapor and liquid are the same. Such azeotropic mixtures cannot be separated by normal distillation but only through complicated processes. Frequently, an additional substance is added to break down this azeotropic mixture. This additional substance must subsequently be completely removed and recovered from both product streams. Prior art processes using other membranes and gels did not provide the desirable properties of the processes of this invention.

The processes of the invention differ from microfiltration or ultrafiltration, processes wherein porosity is the key to preferential transport, and the flux rate depends upon molecular size. In the invention described herein using pervaporation/vapor permeation, molecular interaction between membrane and separated species is the determining factor rather than the molecular size. The main component of the pervaporation/vapor permeation process is the membrane material which determines the permeation and selectivity and hence the separation properties of the process.

A further criterion for the suitability of the per-vaporation membrane is its chemical and thermal stability. To obtain a high trans-membrane flow and a sufficient driving force, it is necessary to operate the pervaporation process at the highest possible temperatures. This means that the membrane will be in contact with a feed mixture containing a high concentration of organic components at high temperatures. To achieve an economical lifetime of the membranes all components of the membrane must be durable under aggressive conditions. The most common dehydration membrane reported in literature for use in pervaporation processes is prepared from polyvinyl alcohol (PVA).

Miyowasa (in U.S. Pat. Nos. 4,016,129 and 4,330,446) describes a hardenable coating comprising an aqueous dispersion of a silica polyvinyl alcohol complex prepared by the reaction between colloidal silica dispersion and polyvinyl-alcohol solution. However, this patent does not teach the casting solution of the invention for use in making membranes.

U.S. Pat. No. 4,148,689 to Hino, et. al. describes immobilization of microorganisms by hydrophilic complex gels by mixing a water-soluble polymer selected from PVA, gelatin and carboxymethylcellulose with tetraalkoxy-silane; hydrolyzing the resulting mixture by the addition of acid to form a homogenous complex for dispersing the microbial cells in the gelling mixture. This patent mentions that it is impossible to obtain the homogenous complex of the transparent gel when silica sol and silica gel were mixed with water soluble polymers. The problems addressed in this patent are not related to the process of the instant invention.

U.S. Pat. No. 4,279,752 describes uniform, porous PVA membranes. This process involves extracting the silica particles from the partially developed membrane. The reference is not related to use of a homogenous dispersion of silicon dioxide particles.

SUMMARY OF THE INVENTION

The present invention employs novel polymer/ceramic composite membranes composed of hydrophilic mixed matrix material and other compositions using such matrix materials as a mass transfer agent, are used to effect the alcohol/water separation. Matrix membranes described in the present specification contain at least one, and, possibly more than one, hydrophilic polymer along with nano-sized silicon dioxide particles dispersed throughout the membrane matrix that are cross linked using either an acid or an aldehyde. The incorporation of a dispersion of nano-sized silicon dioxide particles (5% to 40% being a preferred amount) results in improved wetting characteristics of the matrix as a result of water absorption by the SiOH groups.

The invention is demonstrated utilizing PVA and/or at least one amine polymer as a hydrophilic polymer and maleic acid or glutaraldehyde as cross linking agent. The polymer/ceramic membranes are fabricated into either homogenous or composites which are clear (without any phase separation) and are loaded with silicon dioxide particles.

In a preferred embodiment, the addition of a second polymer (for example, poly allylamine hydrochloride) into the PVA-silicon dioxide material produces a mixed matrix material that is homogenous, strong and clear without any phase separation between organic polymers and silicon dioxide particles i.e. without any settling out of the silicon dioxide particles. Additionally, the present invention provides a method for fabricating very thin films of the polymer/ceramic materials that are capable of dehydration of streams containing organic-containing streams.

This invention embodies mixed matrix gels of the aforementioned compositions which are prepared in a variety of shapes and show a remarkable degree of reversible water-absorbing properties. Mechanical and physical properties of the gels, such as extent of swelling in water, can be controlled by controlling the mixed matrix material composition.

DESCRIPTION OF DRAWINGS

FIGURE Shows overall view of processes of pervaporation.

DETAILED DESCRIPTION

Pervaporation and vapor permeation are membrane-based operations by which relatively water-free alcohols can be produced in a simple and energy efficient manner. In pervaporation, water from a contaminated organic stream is preferentially transported across a thin membrane film. The source side of this membrane is wetted with the organic liquid. A vacuum or a sweep gas is used on the sink side of the membrane. The water is collected from the sink side by condensation.

Vapor permeation is similar to pervaporation with one major difference—vapors instead of liquid contact the source side of the membrane. In contrast to other membrane filter processes, pervaportation/vapor permeation works according to a solution diffusion mechanism.

For pervaporation and/or vapor permeation processes to be economical and efficient, ultra thin, hydrophilic films of appropriate polymer need to be deposited onto a highly porous support matrix. Such a combination will provide high throughput along with good mechanical stability to achieve the desired separation using minimum membrane area. Since water needs to be transported across the membrane, a high trans-membrane flow hydrophilic membrane must be used. The trans-membrane flow is a function of the composition of the feed. It is usually expressed as permeate amount per membrane area and unit time, e.g. $kg/m^2/hr$, for the better permeating component.

Definitions: By mass transfer agent is meant a broad range of products that take up liquids such as water, including membranes used for pervaporation and vapor permeation but also including dessicants and sorbents. Gel structures or particles may function as sorbents in this context.

The term "gel" may also be used to refer to the coating used in the composite membranes, although the description herein uses the terms "gel" in example 6 and 7 refer to a product most likely used as desiccant.

It is often desirable to combine certain polymers to provide compositions having desirable properties of flexibility, adherence, and film formation with those of a suitable ceramic to provide hydrophilic mixed matrix materials for use in pervaporation/vapor permeation separation processes. The ceramic component materials are selected as membrane materials for this use in these separation processes based on their increased strength and thermal resistance.

The separation efficiencies of the different mixed matrix membranes were evaluated by comparing two values, flux and selectivity. These two values were evaluated by by varying of a number of conditions such as feed temperature, flow rate and permeate pressure. The use of properly selected absorbent with compatible polymer makes it possible to obtain a mixed matrix membrane having outstanding flux capabilities for given fluid mixtures.

Use of matrix composites described herein will facilitate a viable separation process because of the marked differences in their respective permeabilities through the hydrophilic mixed matrix membranes or gels. The matrix gels of the invention have high swelling capacity when placed in water but remain insoluble in water. The gels have reversible water absorbing properties and retain their shape characteristics after the removal of water and are reusable.

The Pervaporation Process:

The mixed matrix materials described herein were fabricated using commercially available chemicals, including PVA, (99% hydrolyzed); polyallylamine hydrochloride; glutaric dialdehyde (glutaraldehyde), (50% by wt. solution in water); and maleic acid, (99%). Two types of backing materials were used for composite membrane preparation-1) METRICEL POLYPRO™, a porous mixed cellulosic ester material sold by Gelman Sciences, using a 0.1 micron pore size, and polyamide AK membranes obtained from Osmonics Corporation, USA. The polyamide membranes used were asymmetrical. The colloidal silica product was obtained from Nissan Chemical Industries, Ltd. (USA), under the names SNOWTEK-O™, and UP™. SNOWTEK O is a clear, aqueous colloidal silica sol having a pH of 2-4 and containing 21.5% by wt.nano-sized particles (10-20 nanometers) of silicon dioxide dispersed in water.

A schematic diagram of a pervaportation bench scale unit used is shown in fig. I. The feed tank (1) was a 20 liter stainless steel ASME pressure vessel. The feed consisting of IPA and water mixture, varying in water concentration from 5-20% wt, is made up in the feed tank by adding predetermined amounts of IPA and water. The feed mixture was circulated between the feed tank which contained a magnetic stirrer (2) and the pervaporation cell (5) in a closed loop using a gear-type liquid pump (3). Liquid flow rate was measured with a rotameter (6).

The temperature of the feed liquid was held constant by passing the feed through the inner tube of a tube-in-tube heat exchanger. The temperature of the shell fluid was controlled via a thermostate-regulated recirculating bath. The feed liquid temperature and the permeate vapor temperature were monitored by two thermistor thermometers inserted in the upper and lower compartment of the cell, respectively. The temperature gauge is shown at (9).

A vacuum gauge (10) monitored the downstream pressure and the vacuum system (8) stabilized the permeate pressure to below 1 torr. Permeate was collected in a cold trap (7) cooled with liquid nitrogen. After a pervaporation process had been initiated a three to four hour equilibration period was employed to reach the steady state mass transfer regime. After this initial period, steady state permeation collection was initiated. The tests were run batchwise over a time interval of two hours. The permeate liquid thus recovered was weighted and analyzed to evaluate permeation flux and selectivity. The total flux was simply calculated from the amount collected. The selectivity was calculated from the feed and permeate composition.

A stainless steel membrane filtration cell fabricated in house with an effective membrane area of 40.0 $cm^2$ was used in cross flow mode. The membrane was supported by a fritted stainless steel support. The cell was sealed by Viton O rings. The feed entered the cell at one end of the upper compartment, flowed along the length of the membrane and exited the cell at the opposite end of the upper compartment. The feed circulation across the test cell was 1500 ml./min. of the IPA/water mixture. Separation experiments were conducted at temperatures of 30° C. 40° C., 50° C., 60° C., 70° C. and 75° C. The feed samples were taken for each run, one at the beginning and another at the end of the process. The reported feed concentration was the average concentration of these two samples. One permeate sample was acquired during each run. The cold trap was first weighed after warming to room temperature and then the permeate sample was dissolved in 20-30 ml. of methanol. All feed samples and some permeate samples required dilution in methanol in order to fall within the analytical calibration range. All diluted samples were transferred immediately to 20 ml. vials and capped with Teflon lined septa. The composition of both feed and permeate were analyzed by direct injection gas chromatography. (GC) using HP 6890 series GC equipped with a flan ionization detector.

Mixed Matrix Materials.

The mixed matrix membranes are comprised of organic polymer materials having a solid particulate absorbent incorporated therein. In a preferred embodiment of the invention, the organic polymer material will be selected from the group of materials having affinity for water. The solid particulate adsorbent material which is incorporated in the hydrophilic organic polymers, particles being nano-sized, said material possessing hydrophilic characteristics. When the membranes are prepared as composite membranes with a dense non-porous layer on a support material, the dense non-porous layer is applied to the support by solution casting followed by cross linking. An asymetrically porous support material, i.e. a porous support material which has pores of different average diameters on the front and the back, can be used. One readily available porous support material is reverse osmosis membrane.

Applying PVA based mixed matrix casting solution onto a porous backing layer forms a non-porous separating layer. Aqueous solutions of PVA may vary in concentration from a low level of 0.5 wt. % up to an upper limit determined by the solubility limit of polyvinyl alcohol (PVA) in water. The solubility limit of PVA in water depends upon the degree of hydrolysis and molecular weight of the polyvinyl alcohol. The optimum PVA concentration range is from 5 to 8 wt %.

After applying the mixed matrix polymer/ceramic solution to the porous backing layer, cross linking takes place during drying with use of the cross linking agent. Temperatures between room temperature and 200° C. accelerate the drying and cross linking. Preferred temperatures will normally be in the range of 80° C. to 180° C, more preferably 100° C. to 150° C. The cross linking time is at least 1 minute, usually in the range of 1 to 60 min., preferably 5 to 30 min.

The gels may be formed by excluding a small quantity of water from the starting homogenous aqueous solutions. Gels insoluble in water having a variety of mechanical and physical properties as well as varied capacity for swelling in water can be prepared by controlling the initial mixed matrix material composition. The water-swollen mixed matrix gels, when dried, result in very hard materials that are greatly reduced in size compared to the starting water swollen gels. The hard materials show high swelling when placed again in water. Such a reversible water absorbing property can be attributed to the dispersed particulate silicon oxide.

EXAMPLE 1

To a granular PVA, water was added to yield PVA concentration in the range of 5-10 wt %. Clear and homogenous PVA solutions were obtained upon heating the mixture for 5 hours in an oven kept at 100° C. The solution was cooled to room temperature before use. A predetermined amount (0.15-1.00 g.) of cross linking agent (acid or aldehyde) was added to 25-30 g. of the polymer-containing solution and shaken well until the cross linker completely dissolved.

Next, 2-10 g. of a clear aqueous solution containing 21.5 wt % of nano-sized silicon dioxide particles was added and shaken well to obtain a clear mixed matrix solution. In some formulations a 10-15 wt % aqueous amine polymer solution was added and shaken well until all the components were homogeneously mixed. (Studies revealed that mixing is very important in order to avoid phase separation and obtain clear and homogenous membranes.) Depending on the final membrane thickness required, the mixtures were diluted by addition of 0-30 g. of water. The mixtures were left to stand for 1-4 days at room temperature to facilitate the removal of bubbles. Stand-alone membranes were cast by spreading the solution on a neutral temporary medium such as clear Plexiglas. Glass is another example of a temporary neutral medium. Composite membranes may be cast on a backing material such as a reverse osmosis membrane.

Allowing the cast solutions to stand at room temperature for 0-6 hours to remove water results in the formation of a semi-dry membrane that is thinner and more viscous. The film is then cross linked at 150° C. for 5-120 minutes. Ten to sixty minutes before testing the membranes for their separation efficiency, the cross linked membrane is loaded in a solution of IPA/water (the same composition as the feed for which the membrane is to be used). This soaking was found to ease membrane handling and fixing in the test cell, especially for the membranes containing only one polymer.

EXAMPLE 2

Homogenous membranes using PVA were prepared according to the general method described in example 1 with the following modifications: Membranes were prepared without the addition of a second polymer. Maleic acid was employed as across linking agent with the cross linking carried out for either 30 or 90 minutes at 150° C. Dehydrations of IPA/water mixtures was carried out according to the procedure outlined above and results, flux vs. feed temperature, given in Table 1.

TABLE 1

Effect of $SiO_2$ and Crosslinking Time on dehydration of IPA for example 2.
Feed concentration: IPA 80 wt. % and water 20 wt. %
Permeate concentration: 97-98 wt. % water

| Feed Temperature (° C.) | 0 wt. % $SiO_2$ 30 min. cross linking Total flux g/m²/hr | 30 wt. % $SIO_2$ 30 min. cross linking Total flux g/m²/hr | 30 wt. % $SiO_2$ 90 min. cross linking Total flux g/m²/hr |
|---|---|---|---|
|  | — | 75 | 12 |
| 40 | 79 | 100 | 45 |
| 50 | 146 | 181 | 77 |
| 60 | 209 | 320 | 137 |
| 70 | 389 | 495 | 213 |
| 75 | 550 | 670 | 261 |

The effects due to increase in the feed temperature and membrane cross linking time were on the expected lines, flux increasing with feed temperatures and decreasing with the increased cross linking time.

Table 1 also details the effects of $SiO_2$ presence and absence in the mixed matrix membranes that were cross linked for the same amount of time (30 minutes). At a given temperature, the presence of silicon dioxide particle in the membrane resulted in an increase of the water flux. The increased water flux can be attributed to the presence of $SiO_2$ in the crosslinked PVA matrix which may provide additional pathways for the separation of water. The membranes showed very good separation efficiency. The permeate always contained more than 98.5 wt. % water (compared to 20 wt. % in the feed).

EXAMPLE 3

Membranes were prepared according to the general procedure described in the example 1 with the following modification: Composite mixed matrix membranes were prepared by casting PVA/$SiO_2$/polyallylamine hydrochloride polymer solution on Gelman Sciences backing. Table 2 lists the results obtained on carrying out the dehydration of a feed stream containing 90 wt. % IPA and 10 wt. % water mixture by pervaporation. The presence of poly (allylamine hydrochloride) in the membrane has two effects: a) it imparts flexibility to the mixed matrix material and b) it results in increasing the hydrophilic nature of the membrane. As a result, the water flux increased as compared to results shown in table 1 despite a decrease in the feed water concentration from 20 wt. % to 10 wt. %.

All had been cross linked for 30 minutes.

TABLE 2

Dehydration Results of Example 3

| Feed Temperature °C. | Flux (g/m²/hr.) IPA flux | Flux (g/m²/hr) Water flux | Permeate water concentration |
|---|---|---|---|
| 40 | 10 | 256 | 96.3 |
| 50 | 12 | 357 | 97.4 |
| 60 | 17 | 541 | 97 |
| 70 | 30 | 802 | 96.4 |

EXAMPLE 4

Effect of variation of the permeate pressure on the seperation of IPA/water is listed in table 3. Studies were conducted at a temperature of 60° C. The water flux showed only a marginal decrease (12%) on increasing the absolute downstream pressure from 2 to 25 mm. Hg. The concentration of water at all permeate pressures in the permeate was more than 96 wt. %. The results indicate that dehydration of IPA need not be carried out at very high vacuum.

TABLE 3

Effect of Permeate Pressure for Example 4

| Permeate Pressure mm/Hg | Flux (g/m²/hr.) IPA flux | Flux (g/m²-hr.) Water flux | Permeate water concentration |
|---|---|---|---|
| 2 | 15 | 548 | 97.3 |
| 10 | 15 | 541 | 97.3 |
| 15 | 15 | 495 | 97.1 |
| 20 | 18 | 492 | 96.5 |
| 25 | 18 | 475 | 96.4 |

EXAMPLE 5

The separating layer of the composite membrane contains a mixture of polyvinyl alcohol and polyallylamine hydrochloride with nano-sized silicon dioxide particles dispersed throughout the membrane matrix and cross linked using glutaraldehyde. The backing used for preparing the composite membranes is commercially available polyamide reverse osmosis membrane obtained from Osmonics. The dry composite film was cross linked at 150° C. for 12 minutes resulting in a separation layer having the composition as shown in table 4.

TABLE 4

Composition of Separating Layer of Mixed Matrix Membrane (example 5).

| Material: | wt % |
|---|---|
| PVA | 68 |
| Glutaraldehde | 7 |
| SiO$_2$ | 15 |
| Polyallylamine | 10 |

The results of performing dehydration of IPA by pervaporation shown in table 5 are as follows: 10% water/90% IPA in feed flux=1050 gm/m²/hr at 60° C., 1600 g./m²/hr at 70° C. permeate=97+wt. % water. For comparison, these results are at least two times more than those reported in example 4 (under the same experimental conditions). Table 5 also shows the results obtained with a decreased feed water concentration (5% water/95% IPA). Although the feed water concentration decreased by half (5 wt. % from 10 wt. %) the total flux dropped by 4-5 times with only marginal increase in permeate composition. All results shown in table 5 were found to be reproducible during testing lasting over a period of more than 40 days.

TABLE 5

Dehydration Results of Example 5:

Feed concentration: IPA 90 wt. %/water 10 wt. %
Permeate concentration: 97-98 wt. % water.

| Feed Temperature (° C.) | Total Flux (g/m²/hr.) |
|---|---|
| 40 | 342 |
| 50 | 575 |
| 60 | 1072 |
| 60 | 1044 |
| 70 | 1614 |
| 70 | 1578 |
| 70 | 1631 |

Feed concentration: IPA 95 wt. %/water 5 wt. %
Permeate concentration: 98-99 wt. % water.

| Feed Temperature (° C.) | Total Flux (g/m²/hr.) |
|---|---|
| 40 | 64 |
| 50 | 123 |
| 60 | 210 |
| 70 | 371 |

EXAMPLE 6

Preparation method for hydrophilic mixed matrix gels was as follows: 1) Homogenous PVA solutions in the range of 5-10% were prepared by the same procedure as described above for the membrane preparation. 2) A predetermined amount (0.15-1.0 g.) of cross linking agent glutaraldehyde was added to part of the above polymer solution and shaken well until the cross linker completely dissolves. 3) Next, 6-10 g. of a silica sol such as SNOWTEX-O™ was added and shaken well to obtain a clear solution. The mixture was then either allowed to stand at room temperature for 20-45 days or heated in an oven at a temperature of 50-80° C. for 1-3 days. The viscosity of the solution increased and formed a gel that separated out from the container it was in during this process. The gel, a homogenous aqueous mixed material solution, pulls away from the side of the container as water is expressed out of the gel. The process by which the water comes off the gel may be referred to as "exclusion" from the homogenous aqueous solution. Gels produced by the process are swollen by, but are insoluble in, water. They have reusable and water sorbing characteristics. The gels acquire the shape of the container in which they develop and can thus be formed into a variety of different shapes. Gels having a variety of mechanical and physical properties, including their swelling ability in water can be prepared by controlling the initial mixed matrix material compositions.

EXAMPLE 7

The water swollen mixed matrix gels prepared according to example 6, when dried result in very hard materials that are greatly reduced in size compared to the starting water-swollen gels. The dry and hard materials show high swelling when placed again in water without any disintegration. Reversible water absorbing properties with retention of shape can be attributed to the dispersed particulate silicon oxide. Table 6 lists the composition of the gels and their swelling in water.

TABLE 6

Gel composition and swelling in water (for example 7)

| 59.0 wt % PVA 38.0 wt. % SiO$_2$ 3.0 wt. % glutaraldehyde | Water swollen state | Dry material state |
|---|---|---|
| Length | 4.6 cm. | 3.3. cm. |
| Diameter | 1.8 cm. | 1.1 cm. |
| Volume | 11.71 cm$^3$ | 3.14 cm.$^3$ |
| Weight | 11.3909 g. | 4.8638 g. |
| Water uptake | 6.5271 g. | |
| Swelling % (g/g) | 134% | |
| Swelling % volume | 273% | |

EXAMPLE 8

DSC (Differential Scanning Calorimetry) and TGA (Thermogravimetric analysis) measurements were carried out on polymer/ceramic mixed matrix membranes and gels. The results shown in table 7 indicate all the mixed matrix materials to have high glass transition temperatures relative to typical PVA material. Although there is a decrease in the glass transition temperature due to the inclusion of polyallylamine hydrochloride membranes fabricated from such mixed matrix material are still glassy and, as such, can be safely employed for high temperature dehydration operations. TGA results indicate a more gradual weight loss at high temperatures (300-600° C.) in all mixed matrix containing silicon dioxide particles (especially the hard materials obtained on drying water swollen gels) even at temperatures well over 600° C.

TABLE 7

Glass Transition Temperatures (Tb) for example 8.

| Material | Tg (° C.) |
|---|---|
| Example 5 poly (vinyl) alcohol/silicon dioxide/poly (allylamine) and cross linked using glutaraldehyde | 206 |
| Example 7 poly (vinyl) alcohol/silicon dioxide and cross linked using glutaraldehde | 365 |
| Pure polyvinyl alcohol (for comparison) | 85 |

While silicon dioxides are used in the examples, other oxides such as zeolites or aluminum oxide may be used. It would also be clear to one skilled in the art that other organic polymers known in the art as equivalents may be used in the practice of this invention.

What we claim is:

1. A composition of matter comprising a hydrophilic non-porous, permeation selective membrane matrix containing at least one poly alcohol, particles of at least one inorganic metal oxide, and a crosslinking agent and wherein said particles are dispersed throughout the matrix, containing, additionally, a second organic polymer which does not result in phase separation of the resulting product when mixed with a poly alcohol.

2. The composition of claim 1 wherein the poly alcohol is polyvinyl alcohol.

3. The composition of claim 1 wherein said second organic polymer is a polyallylamine.

4. The composition of claim 1 wherein the particles are silicon dioxide.

5. The composition of claim 4 wherein the is the silicon dioxide is present to an extent of about 5% to 40% by weight.

6. A method of fabricating composite non-porous pervaporation/vapor permeation membranes on a support backing comprising the steps of:
   (1) preparing a casting solution containing an aqueous solution of a polymer, a cross linking agent and an inorganic oxide;
   (2) casting said solution prepared in step (1) on a porous, support backing; and then
   (3) heating the product of step (2) at temperature of 80° C.0 to 180° C. for at least one minute.

7. The method of claim 6 wherein the support backing is an asymmetrical support material.

8. The method of claim 6 wherein said casting solution contains 5 to 10 wt. % vinyl alcohol and said inorganic oxide component comprises silicon dioxide.

9. The method of claim 6 wherein in step 3, the product is heated for 5 to 30 minutes.

10. A composition of matter comprising a hydrophilic permeation-selective gel matrix containing at least one poly alcohol, particles of at least one inorganic metal oxide, and a cross-linking agent wherein said particles are dispersed throughout said matrix.

11. A method of removing water from a water/organic mixture by
   (1) exposing said mixture to a gel of claim 10 and
   (2) allowing the gel to absorb the water from said mixture.

* * * * *